G. RENNERFELT.
ROLLER BEARING.
APPLICATION FILED APR. 9, 1907.
951,288.
Patented Mar. 8, 1910.
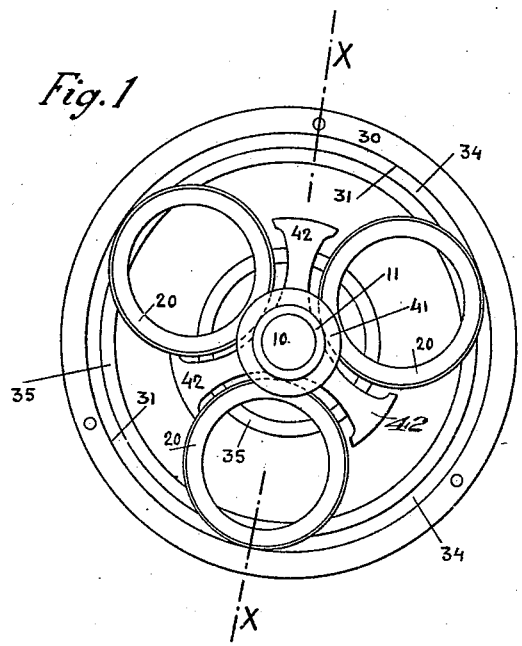
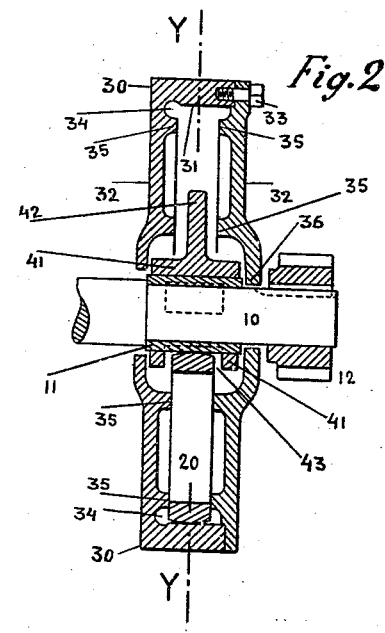
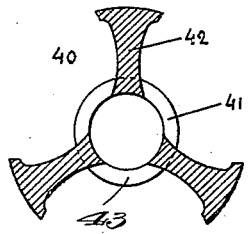
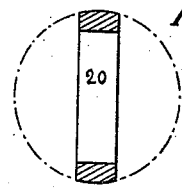
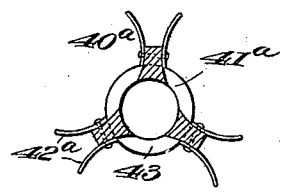
WITNESSES:
INVENTOR
Gustaf Rennerfelt

UNITED STATES PATENT OFFICE.

GUSTAF RENNERFELT, OF SCRANTON, PENNSYLVANIA.

ROLLER-BEARING.

951,288.   Specification of Letters Patent.   Patented Mar. 8, 1910.

Application filed April 9, 1907. Serial No. 367,169.

*To all whom it may concern:*

Be it known that I, GUSTAF RENNERFELT, a subject of the King of Sweden, and a resident of Scranton, in the county of Lackawanna and State of Pennsylvania, United States of America, have invented certain new and useful Improvements in Roller-Bearings, of which the following is a specification.

My invention relates to improvements in roller bearings, and its object is to provide a bearing of this class which is simple and cheap in its construction and efficient in its operation.

I will describe my invention in the following specification, and point out the novel features thereof in claims.

Referring to the drawings, Figure 1 is an end elevation of a bearing made according to my invention, with one of its side-plates removed. Fig. 2 is a sectional side elevation of the same bearing, the section being taken on line X—X of Fig. 1. Fig. 3 is a sectional view of one of the bearing rollers shown in Fig. 1, this section being taken on the line X—X of Fig. 1. Fig. 4 is a sectional view of the spider shown in Figs. 1 and 2, the section being taken on line Y—Y of Fig. 2; Fig. 5 is an elevational view of a modified form of the spider.

Like characters of reference designate corresponding parts in all of the figures.

10 designates a shaft to which my bearing is applied.

11 designates a bushing, preferably of steel, placed over the shaft and arranged to rotate with it; the bushing may thus be considered as a part of the shaft.

12 designates a cog-wheel through which a load may be applied to the bearing.

20, 20, 20 designate a plurality of rollers with flat ends, made of steel or other desired material, and of short length as compared with their diameter. As clearly shown in Fig. 3, the roller 20 is formed with a curved face so that it constitutes the equatorial section of a sphere, this form being preferred in such cases where from any cause there may be a deviation between the center line of the shaft and the center line of the bearing. I also prefer to make the roller hollow or of ring form, as shown in Fig. 3 of the drawings, so as to decrease its weight and increase its elasticity.

30 designates a portion of an outer casing which forms a track 31 for the rollers to run upon, and which is arranged to support the rollers and the shaft.

32, 32 designate plates which may be arranged to be fastened one on each side of the track portion 30 by means of bolts 33 or one of them may be formed integrally with the track portion as shown in Fig. 2. These side-plates thus form portions of the outer casing which supports the rollers and the shaft. The plates are preferably shaped so that they form annular grooves 34, 34 on each side of the track 31, which grooves serve as receptacles for dust or grit which may accidentally enter the bearing. The side-plates 32 are preferably formed with ribs or projections 35, 35, the plane surfaces of which may be tooled until they are smooth and parallel to each other, and at a distance apart slightly greater than the length of the roller, so that the ribs 35 are in loose contact with the end surfaces of the rollers and serve the purpose of guiding the rollers and holding them in parallelism, and in a plane at a right-angle to the shaft. One of the plates is provided with a lip 36 arranged to take up end pressure from the bushing 11.

40 designates a spider having a hub 41 loosely mounted on the bushing and having a plurality of arms 42 which extend between the rollers 20 and between the side-plates 32. The hub 41 of the spider is provided with openings or pockets 43 through which the rollers are in contact with the bushing 11. The arms 42 serve to maintain an approximately constant distance between the rollers. The distance between the outer ends of the arms 42 is designed or constructed, as by grinding, so as to give the rollers a small amount of clearance between said ends.

In Fig. 5 I have shown the spider constructed with yielding arms. This is a preferred construction as it causes less noise in operation. In this case the arms 42$^A$ of the spider are each constructed of two springs riveted to the body portion 41$^A$ of the spider 40$^A$.

What I claim is:

1. A roller bearing comprising a shaft, a track and a plurality of hollow flexible rollers adapted to sustain the entire load upon the bearing, said rollers having each a spherical rolling surface, the diameter of each roller being greater than its length.

2. A roller bearing comprising a shaft, a track and a plurality of hollow flexible rollers adapted to sustain the entire load upon the bearing, said rollers having each a spherical rolling surface, the diameter of each roller being greater than its length; in combination with means for maintaining the axes of the rollers in parallelism with each other and the shaft.

3. A roller bearing comprising a shaft, a track, and a plurality of flexible, spherical rollers each of hollow or ring form; in combination with means independent of said rollers for maintaining their axes in parallelism with the axes of the shaft.

4. The combination of a shaft, a track, a plurality of mobile flexible rollers having flat ends and spherical faces, means for keeping the rollers in parallelism with the shaft, and means for maintaining a distance between the rollers.

5. The combination of a shaft, a track, a plurality of flexible rollers having flat ends and spherical faces, plates fastened to the track and arranged to keep the rollers in parallelism, and a spider having a hub loosely mounted on the shaft, the spider having a plurality of arms extending between the rollers and between the plates, said arms arranged to maintain a distance between the rollers.

6. The combination of a shaft, a track, a plurality of flexible rollers having flat ends and spherical faces, a plate integral with the track, a plate fastened to the track, said plates arranged to keep the rollers in parallelism, and a spider having a hub loosely mounted on the shaft, the spider having a plurality of arms extending between the rollers and between the plates, said arms arranged to maintain a distance between the rollers.

7. A roller bearing comprising a pressure transmitting member, a pressure sustaining member, and a plurality of rollers between said members, each roller constituting a hollow section of a sphere.

8. The combination of a shaft, a track, a plurality of flexible rollers having flat ends and spherical faces, and a spider loosely mounted on the shaft and arranged to maintain a distance between the rollers.

9. The combination of a shaft, a track, a plurality of flexible rollers having spherical faces, said rollers being located between the shaft and the track, means for maintaining the rollers in parallelism with the shaft, a spider loosely mounted upon the shaft having arms extending between the rollers and being provided with pockets through which said rollers have contact with the shaft.

10. The combination of a shaft, a track, a plurality of flexible rollers having spherical faces, said rollers being located between the shaft and the track, a spider having a hub loosely mounted on the shaft and having a plurality of arms extending between the rollers to maintain a distance between them, said spider being provided with pockets through which the rollers have contact with the shaft.

11. The combination of a shaft, a track, a plurality of flexible rollers having spherical faces and flat ends, plates fastened to the track and arranged to keep the rollers in parallelism with the shaft, and a spider having a hub loosely mounted on the shaft, the spider having a plurality of arms extending between the faces of the rollers and between the plates and arranged to maintain a distance between the rollers, said spider being provided with pockets through which the rollers have contact with the shaft.

12. The combination of a shaft, a bushing thereon, a track, a plurality of flexible rollers having spherical rolling surfaces and flat ends, said rollers being located between the bushing and the track, plates fastened to the track and arranged to keep the rollers in parallelism with the shaft, and a spider having a hub loosely mounted upon the bushing, the spider having a plurality of arms extending between the faces of the rollers and between the plates and arranged to maintain a distance between the rollers, said spider being provided with pockets through which the rollers have contact with the shaft.

13. The combination of a shaft, a cylindrical bushing thereon, a track, a plurality of rollers having flat ends, said rollers constituting hollow sections of spheres, plates fastened to the track and arranged to keep the rollers in parallelism with the shaft, and a spider between the plates, said spider having a hub loosely mounted upon the bushing, and having a plurality of arms extending between and coacting with the faces of the rollers to maintain a distance between the rollers, said spider being provided with pockets through which the rollers have contact with the shaft.

14. The combination of a shaft, a track, a plurality of flexible rollers having flat ends and spherical faces, plates fastened to the track and arranged to keep the rollers in parallelism, and a spider loosely mounted on the shaft; the spider having a plurality of arms extending between the rollers and between the plates, said arms arranged to maintain a distance between the rollers.

In testimony whereof, I have signed my name to this specification, in the presence of two subscribing witnesses.

GUSTAF RENNERFELT.

Witnesses:
M. A. WOLFE,
WALTER L. SCHANZ.